3,849,362
INCORPORATION OF FILLERS IN INSOLUBLE, INFUSIBLE OXYBENZOYL POLYMERS

James Economy, Eggertsville, and Roger S. Storm, Williamsville, N.Y., assignors to The Carborundum Company, Niagara Falls, N.Y.
No Drawing. Filed Sept. 4, 1973, Ser. No. 393,763
Int. Cl. C08g 51/34
U.S. Cl. 260—33.2 R                              17 Claims

ABSTRACT OF THE DISCLOSURE

Filler materials are incorporated into normally insoluble and infusible para-oxybenzoyl polymers in such a manner that the polymer-filler bond is improved. The method employed includes admixing the filler material with a para-oxybenzoyl monomer and/or derivative (including pre-polymers) prior to conversion to insoluble form. Preferably, the filler and monomer or pre-polymer are admixed with a high boiling solvent for the pre-polymer which is inert to the polymerization reaction.

After compression molding, high energy rate forging or other suitable article forming process, the insoluble filled polymer made by the process of the invention is of improved properties, e.g., of better flexural strength and abrasion resistance when filled with graphite or glass fibers, compared to graphite- or glass-filled products made by physically mixing the polymer and filler material before the forming operation.

BACKGROUND OF THE INVENTION

The present invention relates to filled, infusible, insoluble and high crystalline aromatic polyesters, more particularly, to filled para-oxybenzoyl polymers. The invention is directed to a method of incorporating a filled material completely and homogeneously into para-oxybenzoyl polymers and to the filled polyesters resulting.

Para-oxybenzoyl polymers, particularly the homopolymer and certain copolymers and terpolymers thereof, have advantageous high temperature stability properties and good strength over wide ranges of temperatures. Additionally, such polymers are insoluble in almost all known solvents and are highly resistant to strong acids. The properties of insolubility and infusibility, while normally being very desirable in shaped products, also usually greatly limit the fabricator's ability to manufacture useful structures from such polymers. The mentioned properties frequently make it extremely difficult to incorporate homogeneously into the polymers various additives, such as fillers, which also may have modifying activities.

The described polymers are preferably compression molded from a powder form and before the present invention any fillers employed in molding powders based on the para-oxybenzoyl polymers were physically mixed with powdered polymer and the mixture was compression molded or high energy rate forged to desired shape. However, as shown by the examination of shaped structures produced by such methods, the fillers were not homogeneously distributed and while the filler material was surrounded by polymer, it apparently was not strongly bonded to the polymer. Possibly, the poor bonds were attributable to the fact that such polymers did not melt about the filler particles but instead flowed to the shape of the mold under the elevated temperatures and pressures of mold compression conditions. It was also noted that mere physical mixing of the components before compression or high energy rate forging of the powdered polymer-filler mixture often substantially decreased desirable physical properties of the polymer in the resulting shaped article and such was attributed by the inventors to the failure of the polymer to form a cohesive bond with the filler.

SUMMARY OF THE INVENTION

It is an object of the present invention to provide a method for intimately incorporating a filler material in a highly crystalline, insoluble and infusible para-oxybenzoyl polymer. It is another object of the invention to provide a para-oxybenzoyl polymer having incorporated therein filler material in a homogeneous state, with the polymer being insoluble and infusible but being compression moldable. A further object is to produce a filled para-oxybenzoyl polymer in which the presence of a homogeneously distributed filler material to which the polymer is well bonded contributes desirable properties.

In accordance with the present invention a method of making a filled, insoluble, infusible para - oxybenzoyl polymer comprises preparing a dispersion of filler and a solution of para-hydroxybenzoic acid and/or polyester-forming derivative thereof in a compatible high boiling solvent and condensing the para-hydroxybenzoic acid and/or polyester-forming derivative to an insoluble and infusible para-oxybenzoyl polymer having the filler incorporated therein. Also within the invention are the improved filled polymers resulting.

The polymers of the present invention have filler material intimately mixed therewith, with the polymer "wetting" the filler material surface, thereby cohesively and homogeneously bonding filler and polymer together. Scanning electron micro-photographs clearly illustrate this desired result in the molding powders or molded articles. Additionally, articles molded from the present filled polymer possess substantially improved properties as compared to those made by previous methods of incorporating the inert filler material.

Scanning electron microphotographs of the invented molding powders and controls, at a magnification of one thousand, show graphite flakes or other filler particles resting on the outside of the para-oxybenzoyl polymer, apparently lightly adhering to it, when mere mechanical mixtures are made. On the contrary, when further polymerization of previously only slightly polymerized para-oxybenzoyl takes place in the presence of graphite or other filler particles the fillers seem to furnish nuclei about which polymerization takes place and an entirely different appearance is noted in such microphotographs. This difference is apparently of significance in determining the properties of the products.

DESCRIPTION OF PREFERRED EMBODIMENTS

The polymer of the present invention is preferably a para-oxybenzoyl polymer having a decomposition temperature in excess of 510° C., which polymer is infusible at temperatures lower than (and even higher than) its decomposition temperature. Such polyesters are most preferably para-oxybenzoyl homopolyesters, as it has been found that such homopolyesters do not have melting points and have very high decomposition temperatures. These polymers are extremely crystalline and are insoluble in known solvents. However, the crystallinity and decomposition temperatures of such polyesters can be reduced if desired, by the addition of a minor percentage of a second (or third) aromatic constituent such as a dihydroxy and/or dicarboxy compound. Typically, compounds such as hydroxyaromatic acids, dicarboxylic aromatic acids and dihydroxyaromatic compounds may be used, preferably those wherein the aromatic radical is phenyl or diphenyl, e.g., meta-hydroxybenzoic acid, isophthalic and/or terephthalic acids, bisphenol, hydroquinone and the like, or combinations thereof. When such additional constituents are added to the polymer, the resulting co- or terpolymer may be a random (usual) or block polymer wherein the constituent groups other than para-oxybenzoyl comprise 25% or less and preferably 10% or less of the polymer by weight. Larger proportions of such constituents may too greatly affect the crystallinity of the resulting polymer and the resulting properties of the polymer, particularly the melting properties and solubility, and very substantial changes in these properties may detract from the most desirable attributes of the para-oxybenzoyl homopolyester. The various reactants suitable for manufacture of the present homopolymers, copolymers and terpolymers mentioned above and processing conditions and proportions for such manufactures are described in U.S. patent application Ser. No. 66,566, a continuation-in-part of Ser. No. 619,577, filed Mar. 1, 1967, now abandoned, and U.S. Pats. Nos. 3,637,595; 3,644,593; 3,656,944; 3,622,052; 3,668,300; and 3,669,738, the disclosures of which are incorporated herein by reference.

The fillers of the present invention are normally finely divided solid materials which are inert to the polymerization conditions and are preferably also chemically inert in the polymeric article produced, although they may contribute desirable properties to it, e.g., electrical conductivity, lubricity, high temperature stability, abrasiveness, and strength. They function both as extenders and modifiers and such materials are considered herein as within the terms "fillers" and "inert fillers." Included among such compounds are various extenders, such as silica, including powdered quartz or sand and fumed silicas, silicon carbide, brass, bronze, copper, tin aluminum, molybdenum sulfide, iron, steel, ferrous and non-ferrous alloys, nickel, tungsten carbide, aluminum oxide, glass fibers, ground glass, ground glass fibers, tin oxide, iron oxide, zinc oxide, carbon graphite, metals and metal oxides generally and insoluble metal salts, e.g., metal chromates. Such fillers often improve the molding properties of the polymer and additionally, if incorporated in the course of the present invention, can be added in very substantial amounts without detracting from desirable attributes of the polymer, such as strength and moldability, to the extent that they would if merely mechanically mixed with the polymer. Pigments, such as titanium dioxide and other inorganic and high temperature resistant organic pigments can also be incorporated in accordance with the present invention to provide white or colored polymer materials, which may also have other properties thereby improved.

Polymer modifiers such as polyhalogenated addition polymers which are stable at temperatures of at least 200° C. and, more preferably, at least 260° C., and which have mean molecular weights of more than 6,000, e.g., 6,000–200,000, are useful additives too. However, because such materials may not be sufficiently stable to withstand the temperatures and other polymerization conditions for making the insoluble, infusible para-oxybenzoyl polymers, a modification of the method of this invention may be found suitable. Of course, it is desirable that those inorganic fillers or other materials which are able to withstand the polymerization conditions should be mixed with the para-oxybenzoyl monomer, monomer mixture or pre-polymer before polymerization to the insoluble, infusible product.

When utilizing polymeric modifiers such as described, it may be found expedient to heat the modifier, in the presence of the monomer and/or pr-polymer to an intermediate temperature at which said polymeric modifier is stable, said temperature being below the preferred polymerization temperature. Thus, one may heat such a polymeric modifier in the presence of the monomer or pre-polymer at a temperature at which the condensation or polymeriaztion reaction proceeds at a relatively slow rate, for a sufficient time to establish a protective layer or coating upon the surface of such modifier. The temperature may then be raised to increase the rate of polymerization or condensation and the polymerization or condensation reaction completed.

The polymer modifiers mentioned above may suitably be formed by the addition polymerization of one or more unsaturated halogenated monomers such as tetrafluoroethylene, perfluoropropylene, chlorotrifluoroethylene and vinylidene fluoride. The halogenated monomers are mixed in ratios such that at least 80 mole percent of the halogen units in the resultant polymer are fluorine. Suitable addition polymers are polytetrafluoroethylene, commercially available as Teflon TL–126, and a copolymer of tetrafluoroethylene and perfluoropropylene, commercially available as Teflon TL–120. Other addition halogen polymers, including chlorinated and brominated high temperature polymers, can be used to achieve desired results.

The various inert bulk extenders or fillers previously mentioned and others used for such purpose in the plastics art may be of various particle sizes, and normally the size employed will depend upon the particular filler and the intended use of the molded product. However, the normal particle size will be from 0.1 micron to 1000 microns equivalent diameter, preferably from about 1 to 100 microns. For fibers or fillers in which the length:diameter ratio is comparatively great, e.g., 3:1–100:1, the lengths are adjusted proportionately.

For best results the filler material is dispersed in an inert solvent prior to addition to the condensation or polymerization reaction. Alternatively, the monomeric reactants can be added to the dispersion and the condensation reaction can be commenced subsequently. What is important is that the filler should be well dispersed when polymerization is effected. Numerous inert high boiling solvents (with boiling points over 300° or 350° C., and preferably over 400° C.) have been found to be useful as dispersion and polymerization media. A class of solvents which has been found to be particularly suitable for both the dispersion of the filler material and use as the condensation solvent having the desired inertness and high boiling points, includes the terphenyls. Also, a eutectic mixture of diphenyl oxide and diphenyl, which is commercially available under the trademark of Dowtherm A, and mixtures of various polychlorinated polyphenyls such as chlorinated biphenyls, which are commercially available under the trademarks Therminol FR and Aroclor have the desired inertness and high boiling temperatures. Additionally, polyphenyl ether, polyaromatic ethers and mixtures thereof having boiling points in excess of 400° C. have been found to meet the requirements of the present invention. Therminol® 77, described in U.S. Pat. 3,406,207 is also very good for this purpose.

It is possible to conduct the polymerization reaction without the presence of the high boiling inert solvent of the type mentioned (described at length in the patent applications and patents previously referred to) so long as the filler may be dispersed in a melt or other liquid state polymerizable material. Normally, however, heat transfer and wetting effects are not as satisfactory and the desired wetting of the filler with polymer is not as effective as when the solvent is employed. Nevertheless, the result is better than obtained from mere mixing of powdered components before compression molding or high energy rate forging.

The inert filler materials are added to the solvent in proportions sufficient to provide a free flowing mixture of solvent and filler. Generally, the solvent will be a major proportion of such mixtures, usually being from 2 to 200 times the quantity of filler and preferably from 5 to 50 times such quantity. Depending upon the particular inert filler utilized, the fillers may be merely mixed to disperse them throughout the solvent or, as is often preferred with pigments and graphite, milling in the solvent can be used to provide a more uniform dispersion.

The polymers of the present invention are preferably produced by the homopolymerization of para-hydroxybenzoic acid or a polyester-forming derivative thereof, or copolymerizations or terpolymerizations thereof with aromatic dihydroxy and/or dicarboxy compounds. An ester interchange reaction can be utilized wherein the reacting monomer is phenyl-para-hydroxybenzoate or acetoxy-para-hydroxybenzoic acid. Such methods are described in the cited applications and patents. The condensation reaction may be effected in the presence of the various inert solvents described or in the molten state, but it is advantageously carried out in the noted nonreactive high boiling solvents. The utilization of such inert solvents tends to make the polymerization more easily controllable and better distributes filler therein.

The rates of condensation and polymerization are largely dependent on reaction temperature, with increasing temperatures expediting the reaction. Little or no polymerization occurs at room temperature, with good reaction rates and product being obtained in the temperature range of from 250° to 425° C., preferably from 300° to 400° C. and most preferably from 340° to 390° C. Reaction times may be from ½ to 24 hours, preferably from 1 to 12 hours and most preferably from 1 to 6 hours.

In the ester interchange reaction, the reaction is advanced, preferably in the presence of the noted inert high boiling solvents, which are compatible with the distillation of acetic acid, phenol or other product, as the case may be. Accordingly, it is usually advantageous to employ the highest practicable temperatures to expedite the condensation reaction. The maximum temperature which is used is about 425° C. and in particular instances will be governed in part by the boiling point or decomposition point of the particular reactants and the solvent material. The temperature limitation imposed by the particular monomers involved can be controlled (increased to some extent) by utilizing initially lower temperatures and increasing the temperature as the condensation reaction progresses.

The dispersion of filler and solvent may be added at the beginning of the condensation reaction or at any time prior to the formation of insoluble polymer which begins to precipitate from the reaction mixture. In other words, the dispersion of filler is added to the reaction mixture prior to the formation of oligomers corresponding to a chain link of more than about 2 to 5 aromatic units. Beyond such stage, the solubility of the polymer decreases very rapidly as the polymer chain length increases, even at elevated reaction temperatures. The addition of the filler material to the reaction mixture at this early stage permits the condensation reaction to continue with polymer wetting, condensing and polymerizing on the surface of the inert filler materials. The term "polyester-forming derivative of para-hydroxybenzoic acid" includes the monomer, esters and acetoxy and other derivatives and oligomers or pre-polymers, providing that they are soluble in the solvent or liquid medium. It excludes insoluble polymer or the longer chain and insoluble oligomers.

The amount of inert filler added to the reaction mixture is best measured in terms of percent by weight of the formed product, i.e., polymer-filler composite. This amount can vary greatly depending upon the particular inert filler being utilized and the intended purpose of such filler. For instance, when pigments are utilized, it is normally not necessary to utilize more than about ½ to 5%. However, even when pigments are utilized, it may be desirable to use additional fillers, suchs as ground glass, as an extender, thereby increasing the total proportion of the filler in the polymer substantially.

Inert fillers such as the noted extenders can be added in amounts varying from about 0.5 or 1% up to about 90% by weight of the product (including filler). Normally, when such fillers are used, it is desirable to add them in substantial amounts such as in the range of about 5 to 80%, and when polyhalogenated plastics are employed, these may be from about 10 to 90% of the mixture, to contribute sufficiently their modifying properties.

Having added the filler material to the reaction mixture, the polymerization is continued with mixing to achieve the desired state of polymerization. The reaction may be effected without the use of a catalyst. However, it is sometimes preferable to employ a catalytic amount of a suitable condensation catalyst. Suitable catalysts are those known as transesterification catalysts, which include, for example: sodium alkoxides; titanium alkoxides, such as tetra- and butylorthotitanates; sodium titanium alkoxides; lithium hydroxide; magnesium hydroxide; and para-toluene sulfonic acids and salts.

The reaction process is carried out to achieve a high degree of polymerization so that the polymer does not melt at a temperature below about 300° C. and the most preferred polymer is infusible at temperatures in excess of 500° C. Such polymers have average molecular weights of at least 5,000 or 10,000, and more preferably of 25,000 or more. These polyesters are characterized by extreme thermal stability. The precise properties of the various polyesters will depend upon such factors as molecular weight, whether the polymer is a homopolyester, a copolyester or terpolyester and the particular constituents of such co- or terpolymers. Other factors, such as polymer terminal groups, affect physical properties. In essence, however, the polymers produced in accordance with the present invention are highly crystalline, infusible and insoluble in known solvents.

As the polymerization increases to the desired molecular weight, the polymer precipitates from the solvent mixture in particle form. This polmer is separated from the nonreactive solvent which, while being a solvent for the monomer, is not a solvent for the polymer. The polymer is then preferably washed, for instance, with acetone, to thereby extract residual polymerization solvent. The resulting polymer is in a particulate form which can be utilized as such. If desired, further solid state polymerization can be effected. Such polymerization involves heating the polymer at elevated temperatures within the range of 250° to 450° C., preferably under reduced pressure, to facilitate the removal of all traces of water, acetic acid, phenol or other by-product of the polymerization.

The recovered polymer can be used directly for molding shaped articles or it may be ground to a specific particle size or range. Finely divided polymer is preferred for compression molding. Such polymer can range in particle size from a U.S. Standard Sieve Series 5/16 inch sieve to about a No. 200, preferably from No. 6 to No. 100 sieve. Particles passing through such sieves range in size from about 0.05 to about 8 mm., preferably 0.1 to 3 mm. Larger particle sizes or granules can also be used. However, finely divided polymer is generally more suitable for compression molding because the polymer more readily compacts in the mold to a high density prior to the compression operation, as it apparently also does better with the wetted filler product.

The invention will be more readily understood with reference to the following examples which are illustrative of certain preferred embodiments thereof. Unless otherwise indicated, all temperatures are in ° C., and all parts and percentages are by weight.

Example 1

A mixture of 207 parts of para-hydroxybenzoic acid and 204 parts of acetic anhydride is placed in a reaction vessel and heated with stirring to 145° C., at which temperature it is refluxed for one hour. A dispersion of 24 parts of milled glass fibers (diameters in the 1 to 100 microns range and 1:d ratios of 5:1 to 20:1) in 1,000 parts of a partially hydrogenated terphenyl, marketed under the trademark Therminol 66, is then added to the hot reaction mixture. The total mixture is then heated to 340° C. over a one hour period and the reaction mixture is held at that temperature for an additional hour. A total of 231 parts of distillate is collected during this heating and polymerization period. The reaction mixture is then cooled and the Therminol® is removed by extraction with acetone. The resulting product is dried in a vacuum oven at 110° C. A yield of 178 parts of polymer product is obtained.

The resulting product is examined under a scanning electron microscope. The examination shows that the glass fibers are coated with polymer. Ignition of the polymer at 550° C. in air for 4 hours produces a residue of 11.4%. This corresponds to the approximate addition of the ground glass fibers.

Samples of the filled polymer, as a powder of particle sizes in the 0.1 to 3 mm. range, are compression molded at 368° C. and 3,000 lbs./sq. in. with a dwell time of 5 minutes, to form shaped discs. Examination of the molded shaped polymer shows that the glass fibers are still well coated with polymer. This appears to be due to polymerization occurring about the particles of filler in the solvent dispersion. Similar results are obtained when the other mentioned fillers are used, when the "molded" discs are changed to other shapes, e.g., rods, tubes, and when these are produced by high energy rate forging. Also, comparative experiments with mechanically mixed polymer and fillers result in products in which the filler is not as satisfactorily wetted with polymer and in which product properties, e.g., flexural strength, are dimiished.

Example 2

Following the procedure of Example 1, a mixture of 138 parts of para-hydroxybenzoic acid and 138 parts of acetic anhydride is placed in a reaction vessel, heated to 145° C. and refluxed at this temperature for 1 hour, while a dispersion in 700 parts of Therminol® 66 is prepared of 16 parts of milled glass fibers and 16 parts of alumina, both of diameters in the 10 to 1000 micron range, with the 1:d of the glass fibers being about 1:3 to 1:20 and that of the alumina being about 1:1 to 1:2. The dispersion is admixed with the hot reaction mixture. The reaction mixture is then heated to 340° C. over a period of 1 hour and heating is continued at this temperature for an additional 30 minutes. During this period, 157 parts of distillate are collected.

A second dispersion of 60 parts of polytetrafluoroethylene in 225 parts of Therminol® 66 is made using a high speed and high shear blender. This dispersion is then added over a 15-minute period to the hot reaction mixture, after completion of polymerization, at a temperature of about 250° C. The mixture containing the polytetrafluoroethylene is then cooled and the Therminol® 66 is extracted from the polymer with acetone. The resulting polymeric product is dried in a vacuum oven at 110° C. A yield of 168 parts is obtained.

The resulting composition comprises approximately 55% filler material, of which approximately 36% (total basis) is a lubricant material, i.e., polytetrafluoroethylene, and approximately 19% inert extender (milled glass fibers and the alumina). It is size-reduced to particles of diameters of 0.1 to 3 mm.

Examination of the resulting polymer, both before and after compression molding, indicates that the filler material is well dispersed throughout the polymer and the polymer is adhering to the filler material.

Example 3

A mixture of 856 parts of phenyl-para-hydroxybenzoate, 0.015 parts of tetra-n-butyl orthotitanate and 1800 parts of polychlorinated polyphenyl solvent (boiling point 360–370° C.) is heated with constant stirring under an atmosphere of nitrogen. The temperature is maintained at 170° to 190° C. for 4 hours. A dispersion of 7 parts of $TiO_2$ (pigment grade) in 100 parts of Therminol® is prepared by milling in a ball mill to the indicated fineness. This dispersion is then added to the reaction mixture with stirring.

The temperature is then increased to 340° to 350° C. and is held there for 10 hours. During the heating cycle, condensation occurs, accompanied by distillation of phenol. The polyester formed in the condensation reaction precipitates from solution. The mixture is cooled to room temperature and the solvent is removed by extraction with acetone. The resulting product is further dried in a vacuum at 60° C. to produce a yield of 384 parts of polyester.

Compression molding of this product produces white pigmented shaped articles with the $TiO_2$ pigment being homogeneously dispersed throughout the polymer and wetted by the polymer.

In a like manner, copolymers of para-hydroxybenzoic acid, hydroquinone and mixed terephthalic and isophthalic acids, in which the hydroxybenzoic acid portion is 85% and the other monomers are about 7.5% each; are made by the methods of U.S. Pat. 3,637,595, modified as taught herein. With the fillers of Examples 1–3 incorporated therein according to the invention correspondingly good results are obtained. Also, other inert fillers, in greater or lesser proportions, as described herein, are incorporated into the para-oxybenzoyl polymer in the manner described herein with similarly improved results, compared to corresponding mechanically mixed control molding powders.

Example 4

In a reaction vessel with a reflux head, a mixture of 55 parts of para-hydroxybenzoic acid, 56 parts acetic anhydride, and 1000 parts Therminol® 66 is refluxed for 1 hour at 165° C. To this hot reaction mixture are added 192 parts of granular tetrafluoroethylene, available under the trademark Teflon 8. The reflux column is exchanged for a distilling head, and the vessel and its contents heated to 250° C., which temperature is maintained for 3 hours. The temperature is then raised, over a ½ hour period, to 340° C., and heating continued at this temperature for an additional 15 minutes. During this period, 54 parts of distillate are collected.

The mixture is then cooled, suction filtered, and washed with hot acetone. The resulting composition comprises individual tetrafluoroethylene granules with an even coating of polymer on the surface. No lumping or agglomeration of the filler granules occurs.

Example 5

207 parts of para-hydroxybenzoic acid and 204 parts of acetic anhydride are refluxed at 145° C. for 1 hour. A premix of 18 parts of graphite powder of diameters in the 1 to 100 micron range in 100 parts of Therminol® 66 is prepared and is added to the previously refluxed reaction mixture, which dissolves in the Therminol.® The contents are then heated to 340° C. quickly, over a period of about ½ hour and heating at 340° C. is continued for an additional hour, during which time 235 parts of acetic acid and acetic anhydride distillate are collected. During the reaction the polyester produced becomes insoluble in the Therminol® and separates out, apparently in conjunction with the graphite particles. The solid product is separated from the Therminol® and any remaining solvent is removed by washing and extracting with hot acetone. The acetone is then removed by drying in a vacuum at 110° C. for 3 hours. 190 parts of polyester, containing graphite filler, are obtained. This material is compression molded at 400° C., being held in the mold for 10 minutes. A scanning electron microphotograph of the molding powder shows it to be oxybenzoyl polymer grown about graphite nuclei. The product's flexural strength is 7,000 lbs./sq. in. and its flexural modulus is $1.2 \times 10^6$ lbs./sq. in. By comparison, a corresponding polymer produced in the described manner but without the addition of any graphite has a flexural strength of about 5,000 lbs./sq. in. and that made from a molding compound produced by mechanically mixing graphite and the polymer is of an average flexural strength of about 2,900 lbs./sq. in. A scanning electron microphotograph of the mechanical mixture indicates that the graphite flakes merely cover the polymer surface.

In repetitions of this work, utilizing different grades and sizes of graphite, within the given ranges, flexural strengths of as high as 10,000 lbs./sq. in. are produced by the method of this invention (when utilizing 50% graphite). Graphite contents of as high as 80% or 90% are also satisfactory. When the process of Example 4 is repeated, using other high temperature solvents than those under the trademarks Therminol 66, e.g., Therminol FR, Therminol 77, Dowtherm A and Aroclor, comparable products and improvements result. Similarly, when instead of the graphite filler the other mentioned fillers are utilized, better wettings of the polymers are observed than in the cases of mechanically mixed molding powders. Also, improved products are made when the molecular weight of the polyester is varied over the range from 5,000 to 70,000.

The invention has been described with respect to illustrations and exemplifications thereof but is not to be considered as limited to these inasmuch as one of skill in the art, with the present disclosure before him, will be able to utilize substitutes and equivalents without departing from the scope and spirit of the invention.

What is claimed is:

1. A method of making a filled, insoluble and infusible para-oxybenzoyl polymer which comprises preparing a dispersion of filler and a solution of para-hydroxybenzoic acid and/or polyester-forming derivatives thereof in a compatible high boiling solvent, condensing the para-hydroxybenzoic acid and/or polyester-forming derivative at an elevated temperature to an insoluble and infusible para-oxybenzoyl polymer having the filler incorporated therein and separating insoluble and infusible para-oxybenzoyl polymer having the filler incorporated therein from the high boiling solvent.

2. A method according to claim 1 wherein the high boiling solvent has a boiling point greater than 300° C., the filler is in particulate form, of particles of diameters in the 0.1 to 1000 micron range, and the condensation reaction to form the insoluble and infusible para-oxybenzoyl polymer is conducted at a temperature below the solvent boiling point and from about 250° to about 425° C.

3. A method according to claim 2 wherein the inert filler particles are inert to the polymer and polymerization reaction conditions but contribute desired properties to the final polymeric article, are of diameters in the 1 to 1000 micron range, constitute from about 1 to 90% by weight of the filler polymer and are dispersed in at least a portion of the compatible high boiling solvent prior to preparation of the dispersion of filler and solution of para-hydroxybenzoic acid and/or polyester-forming derivative thereon in said solvent.

4. A method according to claim 3 wherein the para-oxybenzoyl polymer is a homopolymer and the inert filler is selected from the group consisting of glass, silica, silicon carbide, alumina, metals and mixtures thereof.

5. A method according to claim 4 wherein there is admixed with the para-hydroxybenzoic acid and/or polyester-forming derivative thereof an insoluble filler in the high boiling solvent, a halogenated hydrocarbon polymer which is stable at a temperature of at least 200° C. said mixing being conducted at a temperature below the maximum temperature of stability of said polymer.

6. A method according to claim 4 wherein the high boiling solvent is selected from the group consisting of terphenyls, polychlorinated polyphenyls, polyphenyl ethers, polyaromatic ethers, diphenyl and eutectic mixtures of diphenyl ether and diphenyl.

7. A method according to claim 6 wherein the polymerization reaction is conducted at a temperature of from about 300° to about 400° C. and the high boiling solvent has a boiling point higher than the reaction temperature.

8. A method according to claim 1 wherein the para-oxybenzoyl polymer is a co- or terpolymer of para-oxybenzoyl groups and ester-forming monomers selected from the group consisting of aromatic dicarboxylic acids and dihydroxy aromatic compounds and mixtures thereof, with the polymer consituents other than para-oxybenzoyl, considered as having been derived from para-hydroxybenzoic acid, being less than 15% of the co- or terpolymer.

9. A method of making a particulate, filled, insoluble, infusible para-oxybenzoyl polymer which comprises dispersing a filler in para-hydroxybenzoic acid and/or polyester-forming derivative thereof in a liquid state and condensing the parahydroxybenzoic acid and/or polyester-forming derivative at an elevated temperature to an insoluble and infusible para-oxybenzoyl polymer having the filler incorporated therein.

10. A method according to claim 9 wherein the filler particles are of diameters in the 0.1 to 1000 microns range, the filler is selected from the group consisting of glass, silica, silicon carbide, alumina, metals and graphite and mixtures thereof and constitutes from about 1 to 90% by weight of the filled polymer and the polymerization reaction to form the insoluble and infusible para-oxybenzoyl polymer is conducted at a temperature in a range of from about 250° to 425° C.

11. A method according to claim 9 wherein the filler is particulate unsaturated halogenated monomer selected from the group consisting of tetrafluoroethylene, perfluoroethylene, chlorotrifluoroethylene, and vinylidene fluoride and the polymerization reaction is conducted at a temperature below the decomposition tempearture of said filler for sufficient time to provide a heat-protective layer of insoluble and infusible para-oxybenzoyl on said filler particles, said polymerization reaction being subsequently completed at a temperature greater than the decomposition temperature of said filler.

12. A filled, insoluble and infusible para-oxybenzoyl polymer having a decomposition temperature over 500° C. and comprising 0.5 to 90% by weight of inert filler with the polymer adhering to said inert filler and wetting the surface of said filler.

13. A polymer according to claim 12, in finely divided molding powder form, wherein the inert filler is selected from the group consisting of glass, silica, silicon carbide, alumina, metals, graphite and mixtures thereof and constitutes from about 1 to 90% by weight of the filled polymer.

14. A molded article of the polymer of claim 12, suitable for use as a material of construction, wherein the filler is selected from the group consisting of glass, silica, silicon carbide, alumina, metals and graphite and mixtures thereof and constitutes from about 1 to 90% by weight of the filled polymer.

15. A polymer according to claim 12 wherein the filler is graphite, the proportion thereof present is from 5 to 80% by weight and the polymer is a para-oxybenzoyl homopolymer.

16. A molding powder according to claim 13 wherein the filler is graphite of particles of diameters in the 1 to 1,000 microns range.

17. A polymer according to claim 12 wherein the filler is an unsaturated halogenated monomer selected from the group consisting of tetrafluoroethylene, perfluoroethylene, chlorotrifluoroethylene, and vinylidene fluoride.

References Cited
UNITED STATES PATENTS

| | | | |
|---|---|---|---|
| 3,662,052 | 5/1972 | Nowak et al. | 264—119 |
| 3,644,593 | 2/1972 | Nowak et al. | 260—900 |
| 3,419,517 | 12/1968 | Hedrick et al. | 260—37 N X |
| 3,669,931 | 6/1972 | Annis et al. | 260—40 R X |
| 3,419,460 | 12/1968 | Ure | 260—40 R X |
| 3,759,870 | 9/1973 | Economy et al. | 260—47 C |

LEWIS T. JACOBS, Primary Examiner

U.S. Cl. X.R.

260—33.6 R, 33.8 R, 37 R